J. F. O'CONNOR.
FRICTION DRAFT RIGGING FOR RAILWAY CARS.
APPLICATION FILED JULY 28, 1909.
966,235.
Patented Aug. 2, 1910.
2 SHEETS—SHEET 1.
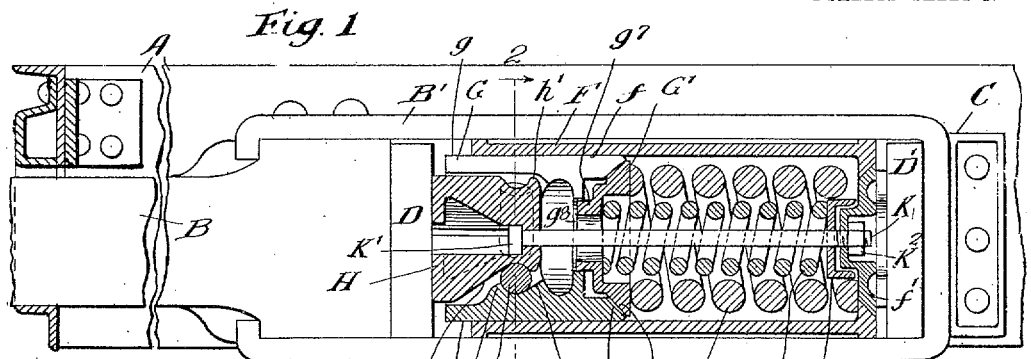
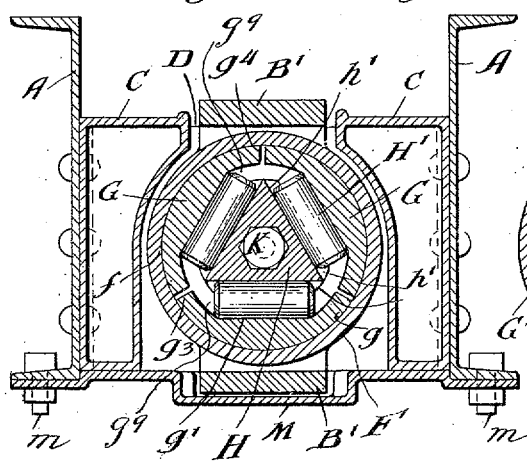
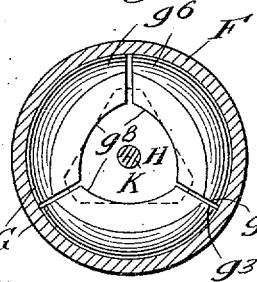
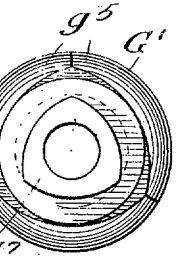
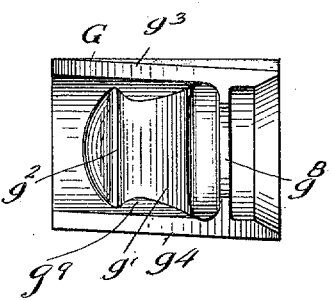
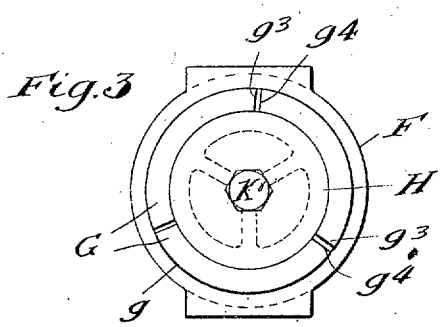
Witnesses:
Wm. Geiger
Inventor:
John F. O'Connor
By Munday, Evarts, Adcock & Clarke,
Attorneys J. F. O'CONNOR.
FRICTION DRAFT RIGGING FOR RAILWAY CARS.
APPLICATION FILED JULY 28, 1909.
966,235.
Patented Aug. 2, 1910.
2 SHEETS—SHEET 2.
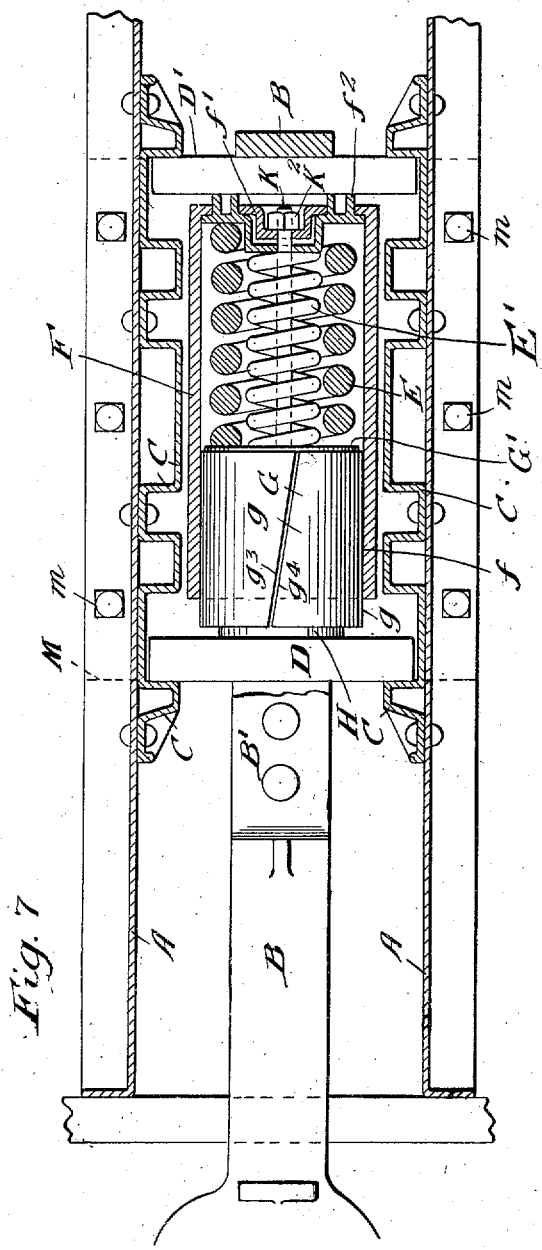
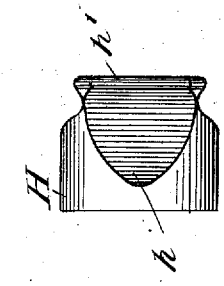
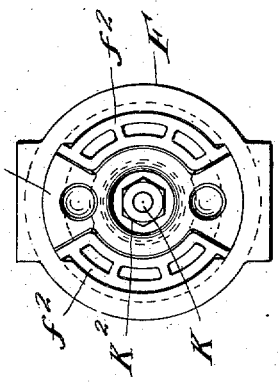
Witnesses:
Wm. Geiger
H W Munday
Inventor:
John F. O'Connor
By Munday, Evarts, Adcock & Clarke.
Attorneys

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING FOR RAILWAY-CARS.

966,235. Specification of Letters Patent. Patented Aug. 2, 1910.

Application filed July 28, 1909. Serial No. 510,075.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging for Railway-Cars, of which the following is a specification.

My invention relates to improvements in friction draft rigging for railway cars.

Heretofore in friction draft rigging of the kind to which my invention particularly relates, and wherein a longitudinally arranged spring reacts at one end against a longitudinally movable friction shell, and at the other end against segmental friction shoes within the friction shell, the shoes being spread apart by a wedge with anti-friction rollers interposed between the wedge and the friction shoes, sometimes the grip-like pressure of the spring against the end of the segmental friction shoes tends to prevent the inner ends of the friction shoes from properly moving outward under the spreading action of the wedge and rollers, thus producing an unequal bearing of the friction shoes against the friction shell from end to end of the shoes and consequent defective operation.

The object of my present improvement is to remedy this difficulty or objection, and it consists in the means I employ as herein shown and described and particularly specified in the claims to practically accomplish this object or result.

It further consists in the novel construction of parts and devices and in the novel combinations of parts and devices herein shown and described.

In the accompanying drawing forming a part of this specification, Figure 1 is a side elevation, partly in longitudinal section, of a friction draft rigging embodying my invention. Fig. 2 is a cross section on line 2—2 of Fig. 1. Fig. 3 is a detail front elevation of the friction shell, friction shoes and wedge. Fig. 4 is a detail cross section of the friction shell showing the rear ends of the friction shoes in elevation, the washer interposed between the spring and friction shoes being removed. Fig. 5 is a detail end view of the washer which is interposed between the friction shoes and the adjacent ends of the springs. Fig. 6 is a detail elevation of one of the friction shoes showing the inner side thereof. Fig. 7 is a plan view partly in horizontal section. Fig. 8 is a detail rear end view of the friction shell and adjacent parts and Fig. 9 is a plan view of the wedge.

In the drawing, A represents the draft sills or members of the car frame to which the draft rigging is applied, the same being preferably center sills, B the draw-bar, $B^1$ the draft yoke, C the draft lugs or stop members secured to the draft sills, D $D^1$ front and rear followers and E $E^1$ the springs.

F is a longitudinally movable friction shell interposed between the followers and having an internal cylindric friction face $f$.

G are segmental friction shoes, preferably three in number, each having an external friction face $g$ in sliding frictional engagement with the internal friction face of the shell F, and each having an inclined or wedge face $g^1$ parallel to and coöperating with one of the inclined faces $h$ of the wedge H, which is preferably three-faced or pyramidal.

$H^1$ are anti-friction rollers interposed between the inclined or wedging faces of the friction shoes G and wedge H, the rollers corresponding in number to the friction shoes. The friction shoes G each have a seat or shoulder $g^2$ to keep the rollers in place and the wedge H is provided with coöperating shoulders $h^1$ and the shoes also have shoulders $g^3$ to keep the rollers in place lengthwise.

The segmental friction shoes G are preferably each an oblique segment of a cylinder so that their parallel meeting edges $g^3$ $g^4$ extend at an angle instead of parallel to the axis of the cylinder. This prevents unevenness of wear of the friction shell at the meeting edges of the segments as the segments reciprocate longitudinally in the friction shell.

To prevent any gripping or binding tendency between the inner ends of the friction shoes and the adjacent ends of the springs and consequent failure of the inner ends of the friction shoes when acted upon by the wedge and rollers to properly spread outward against the friction shell, I interpose between the inner ends of the friction shoes and the springs a washer $G^1$ and provide the same with bluntly flaring cylindrically curved faces $g^5$ which bear against corresponding bluntly flaring cylindrically curved faces $g^6$ with which the friction shoes are provided at their inner ends, the angle of these faces to the axis of the cylinder being preferably more than forty-five degrees, but sufficient to overcome the tendency of the pressure of the springs against the shoes to prevent the inner ends of the shoes from properly spreading or moving outward under action of the wedge H and rollers $H^1$. The coöperating bluntly flaring faces of the friction shoes and washer are preferably each a segment of a cylinder instead of a conical segment in order to secure continued even bearing of the washer against the shoe as the shoes spread or move radially outward under action of the wedge H and rollers $H^1$. The interposed washer $G^1$ is preferably furnished with a central triangularly curved hollow boss $g^7$ adapted to enter and fit in a correspondingly shaped opening formed by the inner shoulders or flanges $g^8$ of the friction shoes G.

In my invention as the contacting inclined faces of the friction shoes G and interposed washer $G^1$ are very bluntly flaring and as the bearing of the washer against the friction shoes is directly at the extreme ends of the shoes, the pressure of the washer against the friction shoes when the springs are compressed will have no injurious effect in the subsequent release action of the draft rigging owing to the blunt flare of the washer and because the anti-friction rollers interposed between the wedge and friction shoes and acting against the middle portion of the friction shoes effectually overcomes any sticking tendency of the friction members when the pressure of the draw-bar against the wedge is relieved; while at the same time the outward pressure of the interposed washer $G^1$ against the inner ends of the friction shoes is sufficient to overcome the gripping action of the springs against the inner ends of the shoes and any consequent failure of the inner ends of the shoes to properly move outward during the compressing or cushioning movement of the draft rigging.

K is the connecting rod which serves to hold all the parts assembled and the springs under an initial tension or compression. Its head $K^1$ preferably bears against the wedge H and its nut $K^2$ against the removable head plate $f^1$ of the friction shell F. The friction shell F also has a supplemental removable plate $f^2$ at its end, which serves as a centering boss for the larger spring and against which the outer end of the smaller spring bears.

M is the removable tie-plate or guide which supports the draft rigging and is removably secured to the draft sills by bolts $m$.

I claim:—

1. In a friction draft rigging, the combination with a friction shell, of friction shoes within the shell, a wedge and anti-friction rollers acting centrally against the friction shoes, a spring reacting at one end against the friction shell and at the other end against the friction shoes, and a bevel faced washer interposed between the adjacent ends of the spring and friction shoes and acting only against the extreme ends of said shoes to prevent the pressure of the spring from interfering with the outward spreading movement of the inner ends of the shoes, substantially as specified.

2. In a friction draft rigging, the combination with a friction shell, of oblique segmental friction shoes within the shell, having their parallel edges extending at an angle to the axis of the shell, a wedge acting against the friction shoes, and a spring reacting at one end against the friction shell and at the other end against the friction shoes, substantially as specified.

3. In a friction draft rigging, the combination with a friction shell, of friction shoes within the shell, a wedge and anti-friction rollers acting against the friction shoes, a spring reacting at one end against the friction shell and at the other end against the friction shoes, and a bevel faced washer interposed between the adjacent ends of the spring and friction shoes, said segmental friction shoes having bevel faces, the bevel faces of said friction shoes and said washer being each an inclined segment of a cylinder, substantially as specified.

JOHN F. O'CONNOR.

Witnesses:
  EDMUND ADCOCK,
  H. M. MUNDAY.